United States Patent Office 3,458,016
Patented July 29, 1969

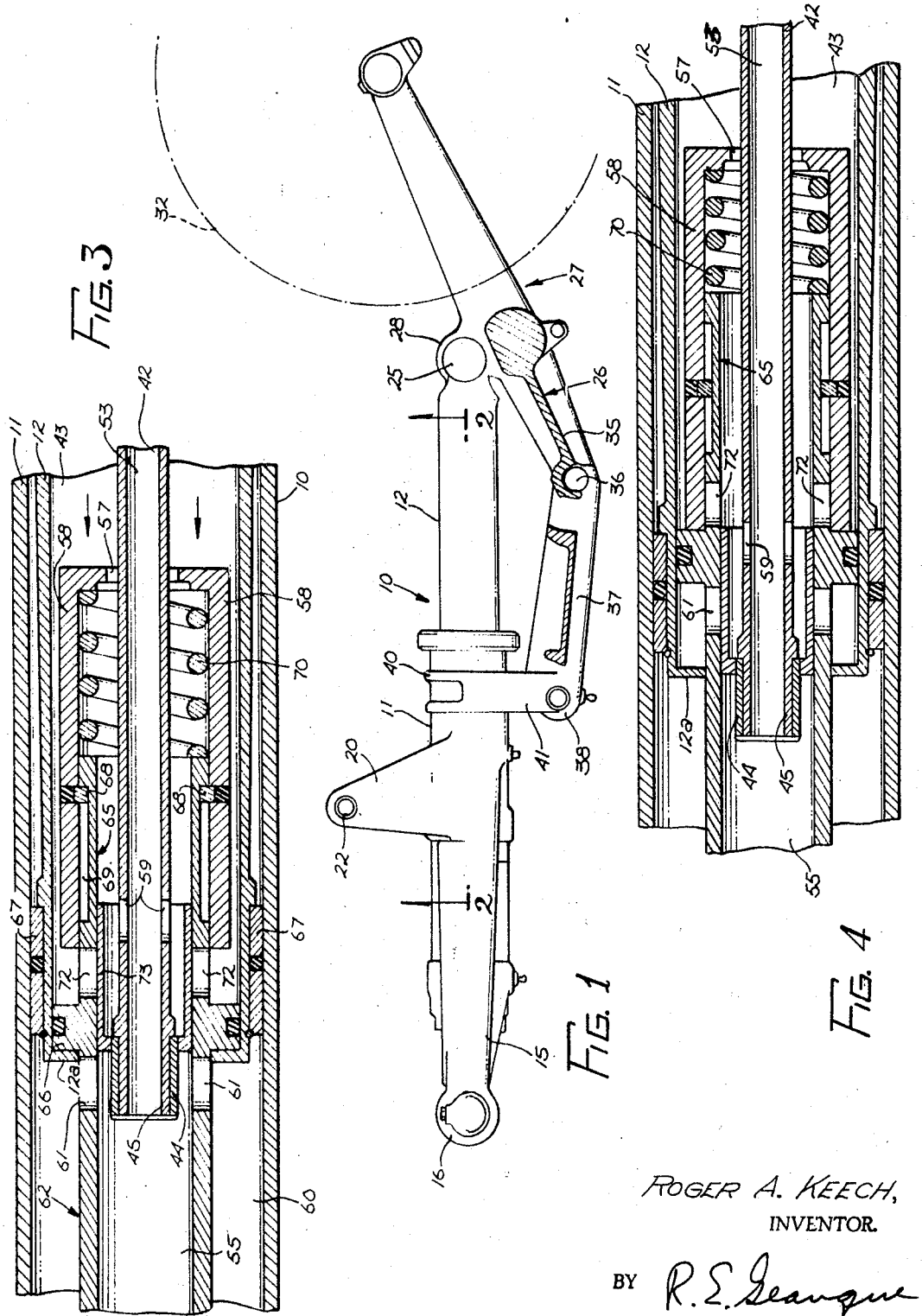

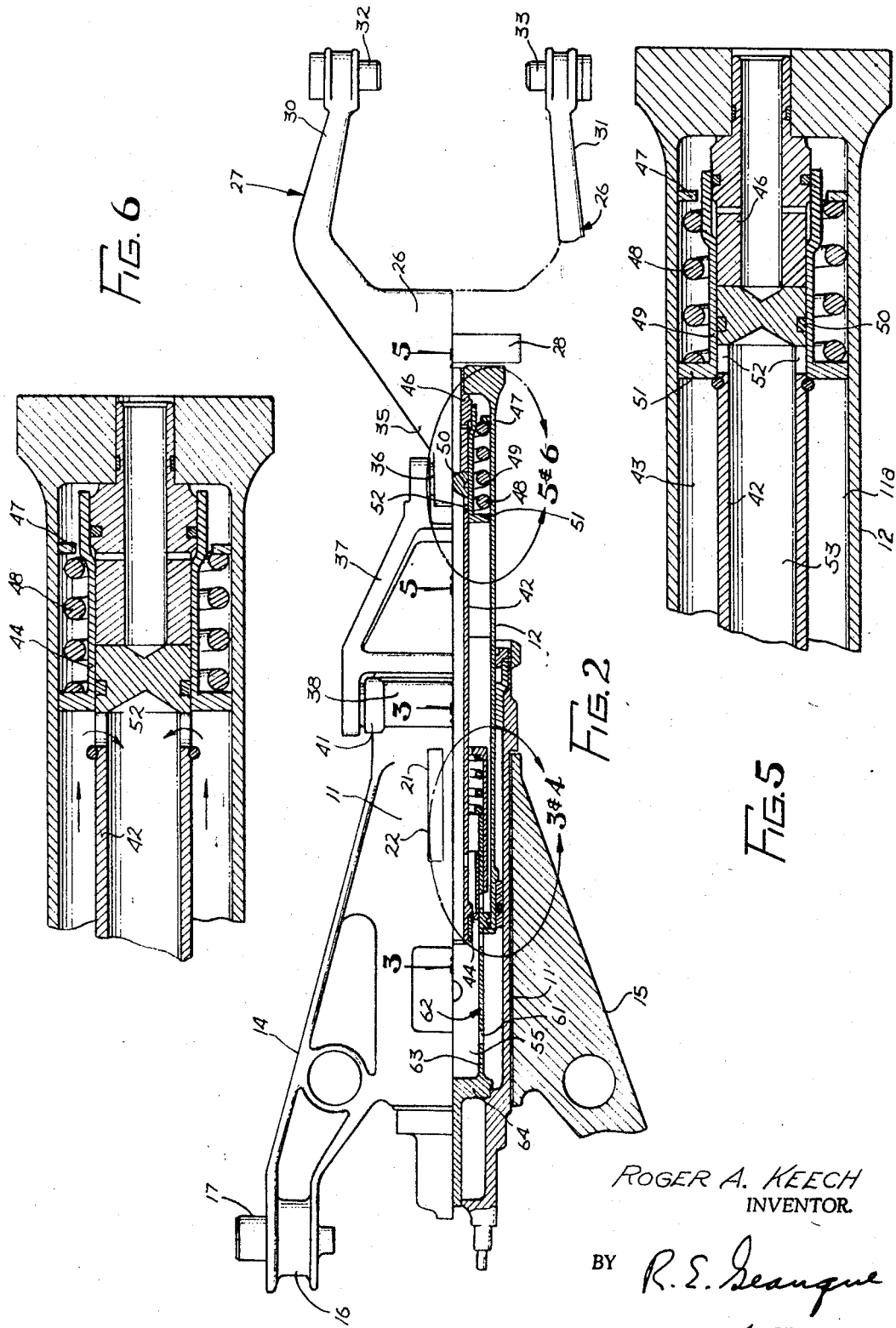

1

3,458,016
SELECTIVE DAMPING DEVICE
Roger A. Keech, San Luis Obispo, Calif., assignor to
Menasco Manufacturing Company, Burbank, Calif., a
corporation of California
Filed Nov. 27, 1967, Ser. No. 685,762
Int. Cl. F16d 57/00, 65/00
U.S. Cl. 188—96                     8 Claims

ABSTRACT OF THE DISCLOSURE

The selective damping device utilizes a small orifice for damping during landing and a larger orifice for damping during taxiing. The small orifice is movable with a valve element which controls the larger orifice. The differential pressure across the small orifice positions the valve element to close the larger orifice during landing. After landing, the differential pressure disappears and the valve element uncovers the larger orifice for taxiing. A relief orifice is provided to prevent too great a chamber pressure during landing.

---

This invention relates to a selective damping device and more particularly to a selective damping device for a shock strut which provides hard damping upon landing and soft damping during taxiing.

On rough terrain, it is desirable to provide soft damping characteristics for high speed, rough taxiing after normal landing with hard damping. Also, it is desirable to hydraulically set the damping system in the landing mode rather than utilize mechanical means for varying the damping characteristics. The shock strut of the present invention utilizes a small orifice for damping during landing and this small orifice is movable with a valve element which controls a larger orifice which is effective during taxiing. During landing, the differential pressure across the smaller orifice positions the valve element to close the larger orifice but once the landing shock has been absorbed, the differential pressure disappears and the valve element uncovers the larger orifice for taxiing. The damping device can also include a relief orifice which is controlled by a spring biased relief valve which is subject to the chamber pressure. If the impact force upon landing produces too great a pressure differential across the small orifice which is effective during landing, the high pressure in the chamber will move the relief valve to uncover the relief orifice, thereby relieving the pressure and preventing destruction of the cylinder.

It is therefore an object of the present invention to provide a selective damping device in which there is hard damping for the initial shock load and soft damping for the residual load.

Another object of the invention is to provide a selective damping device in which the initial shock load is damped through a small orifice to produce hard damping and the residual load is damped through a larger orifice to produce soft damping.

A further object of the invention is to provide a selective damping device for a shock strut which produces hard damping upon landing and soft damping during taxiing.

Another object of the invention is to provide a selective damping device for a shock strut which is hydraulically set in the landing mode when the strut is in landing position.

Another object of the invention is to provide a selective damping device for a shock strut in which the damping action can be relieved when excessive cylinder pressures develop during loading on very rough terrain.

These and other objects of the invention not specifically set forth above will become readily apparent from the accompanying description and drawings in which:

FIGURE 1 is a side elevational view of a shock strut incorporating the selective damping device of the present invention;

FIGURE 2 is a partial horizontal section along line 2—2 of FIGURE 1;

FIGURE 3 is a partial section along lines 3—3 of FIGURE 2 showing the small and large orifices of the damping device in position prior to landing;

FIGURE 4 is a partial sectional view similar to FIGURE 3 showing the small and large orifices in position for absorbing of the initial shock load;

FIGURE 5 is a partial section along line 5—5 of FIGURE 2 showing the relief orifice in the normal position; and FIGURE 6 is a partial sectional view similar to FIGURE 5 showing the relief orifice in the relieving position assumed when excess chamber pressure develops.

The embodiment of the invention chosen for purposes of illustration comprises a shock strut 10 having a cylinder 11 and a piston 12. A pair of webs 14 and 15 extend from opposite sides of the cylinder 11 and each web terminates in a sleeve 16 which is pivotally connected to a strut supporting structure (not shown), such as a part of an aircraft, by means of shaft 17. Also, a pair of brackets 20 and 21 project outwardly from the cylinder 11 and each contains a hole 22 for receiving a strut lowering and raising linkage (not shown).

The outer end of the piston 12 carries a pin 25 which passes through a sleeve 28 carried by a fork member 26 of the wheel mounting linkage 27 in order to pivotally mount the fork member. The fork ends 30 and 31 of member 26 carry mounting shafts 32 and 33, respectively, for rotatably supporting a landing wheel 32. The other end 35 of member 26 is pivotally connected by pin 36 to one end of a link 37 which is also a part of wheel mounting linkage 27. The other end of link 37 is pivotally connected to a pin 38 which is rigidly supported on arms 41 extending from a collar 40 rigidly attached to cylinder 11. When the strut 10 is in landing condition as illustrated in FIGURE 1 with the strut extending downwardly from the aircraft, the piston 12 is extended out of the cylinder 11 so that the strut is in its maximum extended condition.

The piston 12 carries an orifice tube 42 which extends into chamber 43 within the piston and the tube has an enlarged sleeve 44 at its end 45. The other tube end 46 of the tube 42 is secured to the end of the piston 12 and a flange 47 attached to piston 12 serves as a seat for one end of a coil spring 48. A relief valve in the form of collar member 49 slides on orifice tube 42 and seal 50 is located between the tube and collar member. A flange 51 on collar member 49 serves as a seat for the opposite end of spring 48 and when the spring is in its extended position as illustrated in FIGURES 2 and 5, the collar member 49 closes openings 52 in the tube 42 which connects chamber 43 with space 53 within the tube. When the pressure in the chamber 43 becomes excessive, the pressure will act on flange 51 and move collar member 49 against spring 48 to uncover the openings 52 (see FIGURE 6). Since the space 53 discharges to the chamber 55 through the tube end 45, the uncovering of openings 52 will release the pressure in chamber 43.

The end 45 of orifice tube 42 extends through an orifice opening 57 in the end of a valve sleeve 58 which surrounds the orifice tube. The orifice 57 is larger in diameter than the tube 42 to provide a restricted fluid passage from the chamber 43 to the chamber 55 through openings 59 in the tube end 45.

A cylindrical extension 62 has one end 63 secured to the end 64 of cylinder 11 and the other end 65 of the extension has an enlargement 66 which engages the turned end 12a of piston 12 in order to limit the outward extension of the piston. The chamber 55 within extension 62 communicates with chamber 60 around the extension and within cylinder 11, through openings 61 along the extension 62. A sealing member 67 is located around the end 12a of the piston. The extension end 65 slidably supports the sleeve 58 and the sleeve carries stops 68 located in a groove 69 in the end 65 to limit the movement of the sleeve 58. A coil spring 70 is located between extension end 65 and the sleeve 58 to normally bias the sleeve away from end 65 until the stops 68 engage outer end of groove 69 (see FIGURE 3).

The end 65 also contains ports 72 which are uncovered by sleeve 58 when the sleeve is in the outwardly biased position, shown in FIGURES 2 and 3, correspondling to the position of the strut when ready for landing but before the wheels touch. However, in this condition, the ports 72 are closed by a cylindrical member 73 attached to the end 45 of the orifice tube 42. Therefore, fluid cannot flow from chamber 43 to space 55 through ports 72 at touchdown and the fluid can only flow through orifice 57 and openings 59 to the chamber 55.

As the piston 12 moves inwardly after touchdown, the member 73 uncovers ports 72 but the differential pressure created by the flow through orifice 57 has moved the sleeve 58 into the position of FIGURE 4 to cover the ports 72. Thus, the ports 72 are covered by sleeve 58 before the openings are uncovered by member 73 and orifice 57 continues to be effective to damp the movement of piston 12, even though the member 73 moves into chamber 55 and away from orifice 57 as the landing proceeds. By forcing the fluid to flow through orifice 57, which is considerably more restricted than ports 72, a hard damping action is provided during the shock loading.

Once the initial shock load has been absorbed, the differential pressure across orifice 57 reduces and spring 70 moves sleeve 58 to uncover the ports 72. Also, since the extension 73 has moved beyond ports 72, the ports 72 are open to chamber 55 through openings 59 to provide a soft damping action during the residual loading which occurs during taxiing. Therefore, during taxiing and take off, fluid can flow between chamber 43 and chamber 55 through both orifice 57 and ports 72.

When very rough terrain is encountered during landing, an excessive pressure could be created in chamber 43 because of restricted orifice 57. Such an excessive pressure will move the collar member 49 against spring 48 and uncover the openings 52 so that fluid pressure can be released to chamber 55 through openings 52 and space 53. Thus, the destruction of the cylinder and piston is prevented when landings occur on unimproved fields where very high initial fluid pressures are developed. Under normal conditions, however, the collar member 49 moves with the piston and covers the openings 52 in all positions of the piston.

While the invention has been described as applied to a landing strut, it can be utilized as a damping device for all purposes where an initial shock load is followed by a more uniform loading. Also, the means for relieving increased pressures would not be required if conditions were not encountered which developed excessive fluid pressures.

What is claimed is:

1. A selective damping device comprising:
   a piston movable in a cylinder;
   orifice means for restricting the movement of fluid into said cylinder by said piston;
   port means larger than said orifice means for permitting movement of fluid to said cylinder by said piston; and
   valve means for controlling said port means in response to the pressure differential across said orifice means to close said port means during initial shock loading resulting from the initial piston movement and to open said port means during residual loading resulting from piston movement following said initial movement.

2. A selective damping device as defined in claim 1 having relief valve means responsive to the fluid pressure developed by said piston for bypassing said orifice means and said port means when excessive pressure develops.

3. A selective damping device as defined in claim 2 having:
   a hollow orifice tube extending from said piston into said cylinder;
   said relief valve means comprising a valve member slidably on said tube and responsive to the fluid pressure developed by said piston;
   means for normally holding said member against movement by said fluid pressure; and
   fluid opening means in said orifice tube uncovered by said valve member when moved by excessive fluid pressure.

4. A selective damping device as defined in claim 1 wherein said orifice means is located in said valve means to directly transmit said pressure differential to said valve means.

5. A selective damping device as defined in claim 4 having:
   an orifice tube connected to and extending from the said piston;
   said valve means comprising a movable sleeve having an end opening receiving said tube for forming said orifice means.

6. A selective damping device as defined in claim 5 having:
   a hollow extension extending from the closed end of said cylinder and having an open end for receiving said orifice tube;
   said port means being located in said extension and said valve means being slidable on said extension for opening and closing the port means.

7. A selective damping device as defined in claim 6 having a member connected to the received end of said orifice tube for covering said port means when said piston is in fully extended position and for uncovering said port means after initial inward movement of said piston.

8. A selective damping device as defined in claim 7 having:
   biasing means operative between said extension and said movable sleeve for normally positioning said sleeve to open said port means;
   the differential pressure developed across said orifice means upon initial shock loading producing a force to overcome said biasing means and close said port means.

References Cited

UNITED STATES PATENTS

| | | |
|---|---|---|
| 2,161,811 | 6/1939 | Grebe. |
| 2,363,125 | 11/1944 | Foster. |
| 2,657,770 | 11/1953 | Rossman. |
| 3,003,595 | 10/1961 | Patriquin. |
| 3,367,454 | 2/1968 | Schenk et al. |

GEORGE E. A. HALVOSA, Primary Examiner

U.S. Cl. X.R.

188—88; 244—104